(12) United States Patent
Pasch et al.

(10) Patent No.: US 7,001,633 B2
(45) Date of Patent: Feb. 21, 2006

(54) STABILIZATION OF COOKED AND FULLY HYDRATED POTATO COMPOSITIONS

(75) Inventors: John H. Pasch, Lake Zurich, IL (US); Charlotte L. Allen, Mundelein, IL (US); Susan M. Gerulis, Chicago, IL (US); Scott D. Brooks, Appleton, WI (US); Linda K. Jackson, Lake Forest, IL (US); Michael G. Roman, Grayslake, IL (US); John R. Wisler, Rockford, IL (US); Zuoxing Zheng, Palatine, IL (US); Cecily E. Brose, Palatine, IL (US); Peter Begg, Mundelein, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 54 days.

(21) Appl. No.: 10/439,815

(22) Filed: May 16, 2003

(65) Prior Publication Data

US 2004/0228949 A1    Nov. 18, 2004

(51) Int. Cl.
*A23B 7/155*  (2006.01)
*A23L 1/216*  (2006.01)

(52) U.S. Cl. .................. 426/326; 426/637; 426/335; 426/532

(58) Field of Classification Search .......... 426/326, 426/335, 532, 549, 578, 654, 637; 424/780, 424/116

See application file for complete search history.

(56) References Cited

U.S. PATENT DOCUMENTS

| | | | |
|---|---|---|---|
| 3,773,527 A * | 11/1973 | Ruggerone | ........... 426/637 |
| 4,584,199 A | 4/1986 | Taylor | |
| 4,597,972 A | 7/1986 | Taylor | |
| 4,888,191 A | 12/1989 | Anders et al. | |
| 5,015,487 A | 5/1991 | Collison et al. | |
| 5,017,391 A | 5/1991 | Anders et al. | |
| 5,229,154 A | 7/1993 | Street | |
| 5,425,308 A * | 6/1995 | Dickerson et al. | ........... 99/536 |
| 5,447,734 A * | 9/1995 | Street | ........... 426/268 |
| 5,492,704 A * | 2/1996 | Stubbs et al. | ........... 426/96 |
| 5,527,505 A | 6/1996 | Yamauchi et al. | |
| 5,536,525 A | 7/1996 | Mogilevsky et al. | |
| 5,750,165 A * | 5/1998 | Erway | ........... 426/49 |
| 5,945,146 A * | 8/1999 | Twinam | ........... 426/324 |
| 6,110,509 A | 8/2000 | Nauth et al. | |
| 6,113,954 A | 9/2000 | Nauth et al. | |
| 6,136,351 A | 10/2000 | Nauth et al. | |
| 6,242,017 B1 | 6/2001 | Nauth et al. | |
| 6,261,612 B1 | 7/2001 | Ballard et al. | |
| 6,613,364 B1 * | 9/2003 | Begg et al. | ........... 426/41 |
| 6,692,782 B1 * | 2/2004 | Hayes-Jacobson et al. | . 426/102 |
| 6,797,308 B1 * | 9/2004 | Pasch et al. | ........... 426/557 |

FOREIGN PATENT DOCUMENTS

RU          2113126       *  6/1998

* cited by examiner

*Primary Examiner*—Keith Hendricks
(74) *Attorney, Agent, or Firm*—Fitch, Even, Tabin & Flannery

(57) ABSTRACT

The present invention provides starchy food products, especially cooked and fully hydrated potato compositions, including fully hydrated mashed potato compositions and fully hydrated cut potato compositions, which are stabilized against the development of toxins from pathogenic bacterial contaminants. The stabilized compositions are attained by the incorporation of nisin-containing dairy composition derived from a nisin-producing culture. The invention also relates to methods of stabilizing starchy food products, especially cooked and fully hydrated potato compositions, including fully hydrated mashed potato compositions and fully hydrated cut potato compositions, against the development of toxins, wherein the method comprises incorporating nisin-containing dairy composition derived from a nisin-producing culture to the starchy food product. Since these compositions are cooked and fully hydrated prior to packaging, the ultimate consumer only needs to briefly heat the starchy food product in, for example, a conventional or microwave oven prior to consumption.

27 Claims, 2 Drawing Sheets

STABILIZATION OF COOKED AND FULLY HYDRATED POTATO COMPOSITIONS

FIELD OF THE INVENTION

This invention relates to stabilization of starchy food products, especially cooked and fully hydrated potato compositions, including fully hydrated mashed potato compositions and fully hydrated cut potato compositions, against the development of toxins from pathogenic bacterial contaminants. The stabilized compositions are attained by the incorporation of nisin-containing dairy compositions derived from a nisin-producing culture. The invention also relates to methods of stabilizing starchy food products, especially cooked and fully hydrated potato composition, including fully hydrated mashed potato compositions and fully hydrated cut potato compositions, against the development of toxins, wherein the method comprises incorporating nisin-containing dairy composition derived from a nisin-producing culture to the starchy food product. Since these compositions are cooked and fully hydrated prior to packaging, the ultimate consumer only needs to briefly heat the starchy food product in, for example, a conventional or microwave oven prior to consumption.

BACKGROUND OF THE INVENTION

Packaged food products are commonly available to the public in vacuum sealed airtight packets, such as those made of pliable plastic films. The packets are termed airtight to the extent that the films are relatively impermeable to air, so that the components sealed within them at the time of preparation remain largely anaerobic. Such products must be prepared free of pathogenic organisms, especially toxin-producing anaerobes. Pathogenic organisms that may contaminate packaged food products include, by way of nonlimiting example, *Clostridium botulinum, C. perfringens* (Lucke et al., in "Ecology and Control Foods" (A. H. W. Hauschild and K. L. Dodds, eds.) Marcel Dekker, New York, 1993, pp. 177–207; Smart et al., *J. Appl. Bacteriol.* 46, 377–383 (1979); Roberts et al., *J. Fd. Technol.*, 14, 211–226 (1979); Tompkin, *Food Technology*, 34, 229–236, and 257 (1980); Bryan et al., *Amer. Public Health*, 61, 1869–1885 (1971); Microbial Ecology of Food Commodities—Microorganisms in Foods 6; Blackie Academic and Professional, 1998, p. 115), *Listeria monocytogenes, Escherichia coli, Bacillus cereus, Enterococcus faecalis*, and similar microorganisms. Among these, spore-forming, toxin-producing microorganisms are of particular concern, because any spores produced by viable cells may survive and grow to produce toxins subsequent to manufacturing or domestic heating steps. Such microorganisms include species of the genus *Clostridium*.

In U.S. Pat. Nos. 4,888,191 and 5,017,391, Anders et al. disclose compositions and methods related to the use of lactate salts to delay *C. botulinum* growth in a foodstuff such as fish or poultry. The foods are heated to a temperature sufficient to cook the meat but not to sterilize the product. Anders et al. suggest that lactate may be used alone, or in combination with other agents such as sodium nitrite. These patents fail to discuss nisin or its properties.

Maas et al. (*Appl. Envir. Microbiol.*, 55, 2226–2229 (1989)) report that lactate, when incorporated into a turkey meat vacuum-packed composition, delays the generation of botulinum toxin in a manner directly dependent on the concentration of lactate introduced into the composition. Maas et al. do not mention nisin.

Nisin is a peptide-like antibacterial substance produced by microorganisms such as *Lactococcus lactis* subsp. *lactis* (formerly known as *Streptococcus lactis*). Its structure is illustrated in U.S. Pat. No. 5,527,505 to Yamauchi et al. The highest activity preparations of nisin contain about 40 million IU per gram. Commercial preparations of nisin are available. For example, one commercial preparation, NISAPLIN™, containing about 1 million IU per gram is available from Aplin & Barrett Ltd., Trowbridge, England; another commercial preparation, CHRISIN™, containing about 1 million IU per gram is available from Chr. Hansen A/S (Denmark). Nisin has no known toxic effects in humans. It is widely used in a variety of prepared dairy foods. Experimental use in preserving other foods has also been reported. Details on these applications are provided below.

A number of efforts have been reported since 1975 directed to reducing uncoupled acid production in dairy fermentations by controlling the post-fermentation acidification of yogurt. In some of these studies, a nisin producing culture was introduced in an attempt to inhibit these effects. Kalra et al. (*Indian Journal of Dairy Science*, 28: 71–72 (1975)) incorporated the nisin producing culture *Streptococcus lactis* (now known as *L. lactis* subsp. *lactis*) along with the yogurt culture before fermentation. Others introduced nisin in milk prior to fermentation (Bayoumi, *Chem. Mikrobiol. Technol. Lebensm.*, 13:65–69 (1991)) or following fermentation (Gupta et al., *Cultured Dairy Products Journal*, 23: 17–18 (1988); Gupta et al., *Cultured Dairy Products Journal*, 23: 9–10 (1989)). In all cases, the rate of post-fermentation acidification was only partially inhibited by these treatments and the yogurt continued to become more acidic throughout its shelf life. However, as pH drops, flavor and texture defects develop.

In U.S. Pat. No. 5,527,505, by Yamauchi et al., yogurt was produced from raw milk by incorporating a nisin-producing strain, *Lactococcus lactis* subsp. *lactis*, along with the traditional yogurt culture consisting of *Streptococcus salivarius* subsp. *thermophilus* (ST) and *Lactobacillus delbrueckii* subsp. *bulgaricus* (LB). Yamauchi et al. teach that the lactococci are needed to secrete the nisin, whose effect is to retard the activity of ST and LB. The resulting yogurt therefore contains the lactococci used to produce the nisin. Nonetheless, the acidity of yogurt containing the nisin-producing bacteria increased by 64 to 96 percent in 14 days, in various experiments inoculated with differing amounts of *L. lactis* subsp. *lactis*, compared to the initial acidity at the completion of fermentation. Other studies (Hogarty et al., *J. Fd. Prot.*, 45:1208–1211 (1982); Sadovski et al., XX International Dairy Congress, Vol. E: 542-5-44 (1978)) also noted acid production and development of bitterness at low temperature by some mesophilic starter lactococci in dairy products.

In U.S. Pat. No. 5,015,487 to Collison et al., the use of nisin, as a representative of the class of lanthionine bacteriocins, to control undesirable microorganisms in heat processed meats is disclosed. In tests involving dipping frankfurters in nisin solutions, the growth of *L. monocytogenes* was effectively inhibited upon storage at 4° C.

Chung et al. (*Appl. Envir. Microbiol.*, 55, 1329–1333 (1989)) report that nisin has an inhibitory effect on gram-positive bacteria, such as *L. monocytogenes, Staphylococcus aureus* and *Streptococcus lactis*, but has no such effect on gram-negative bacteria such as *Serratia marcescens, Salmonella typhimurium*, and *Pseudomonas aeruginosa* when these microorganisms are attached to meat.

Thomas et al. (*J. Food Prot.*, 65, 1580–1585 (2002) recently demonstrated the use of purified nisin to control spoilage by spore-forming bacteria such as *Bacillus* and *Clostridium* in a pasteurized mashed potato product.

Nisin has been added to cheeses to inhibit toxin production by *Clostridium botulinum* (U.S. Pat. No. 4,584,199 to Taylor). U.S. Pat. No. 4,597,972 to Taylor discloses a detailed example in which chicken frankfurter components are shown to require the presence of both added nitrite and added nisin in order to prevent or delay botulinum toxin production when challenged with *C. botulinum*.

Nisaplin™ has been found to preserve salad dressings from microbiological contamination, such as challenge by *Lactobacillus brevis* subsp. *lindneri*, for an extended shelf life period (Muriana et al., *J. Food Protection*, 58:1109–1113 (1995)).

More recently, nisin-containing whey derived from nisin-producing cultures has been used to stabilize a variety of food products. For example, U.S. Pat. No. 6,242,017 (Jun. 5, 2001) and U.S. patent application Ser. No. 09/779,712 (filed Feb. 8, 2001) use nisin-containing whey to stabilize cooked meat as well as cooked meat and vegetable combinations; U.S. patent application Ser. No. 09/779,756 (filed Feb. 8, 2001) uses nisin-containing whey to stabilize cooked pasta compositions; U.S. Pat. No. 6,110,509 (Aug. 29, 2000) uses nisin-containing whey to stabilize cream cheese; U.S. Pat. No. 6,113,954 (Sep. 5, 2000) uses nisin-containing whey to stabilize mayonnaise products; and U.S. Pat. No. 6,136,351 (Oct. 24, 2000) uses nisin-containing whey to stabilize fermented dairy products, all of which are hereby incorporated by reference in their entireties.

U.S. Pat. No. 5,229,154 (Jul. 20, 1993) provides a method for producing fresh, refrigerated mashed potatoes in which the potatoes were overcooked until they did not gel after cooling. The overcooked potatoes were then ground, blended, pasteurized, chilled, injected with an inert gas and then packaged for refrigerated storage. In order to maximize shelf life, the potato mixture was not exposed to the open atmosphere during processing. A shelf life in the range of 6–8 weeks was reported.

U.S. Pat. No. 5,536,525 (Jul. 16, 1996) provides a method for producing frozen, instant mashed potato product which can be dispensed into oven-stable trays using a high-speed frozen food packaging line. A slurry containing a fat-containing ingredient or a water substitute in water is heated to a temperature above the gelatinization temperature of potato starch but below the boiling point of the slurry. The heated slurry is then mixed with dehydrated potato solids in a closed mixing chamber. Hydration of the potato solids is completed under static conditions. The resulting mashed potatoes are then dispensed into the oven-stable trays, packaged, and frozen.

U.S. Pat. No. 6,261,612 (Jul. 17, 2001) provides a frozen mash potato product having, at least in its top portion or surface, a browning agent. The frozen product can be heated in a conventional or microwave oven to provide a golden brown color. Of course, frozen mashed potatoes are more easily stabilized against microbial growth compared to refrigerated; consumers, however, generally view refrigerated products as having a higher quality.

Nisin has also been used as an adjunct to thermal processing to decrease the severity of heat treatment to product a shelf stable cut, canned potato product (Lokshina et al., *Trudy-Vsesoyuznyi*, 19, 66–67 (1973).

There remains a need for compositions and procedures related to prepared food products, especially starchy food products such as fully hydrated mashed potatoes and fully hydrated potato pieces (i.e., sliced or cut potatoes), that inhibit the growth of pathogenic microorganisms, and the production of toxins by them, using natural or innocuous ingredients. There also remains a need for fully cooked and hydrated mashed potatoes and fully cooked and hydrated potato pieces having a relatively long shelf life under refrigerated conditions. There also remains a need for fully cooked and hydrated mashed potatoes and potato pieces which have a reduced tendency to undergo syneresis during a relatively long shelf life under refrigerated conditions. There also remains a need for fully cooked and hydrated mashed potatoes and potato pieces with a cleaner flavor and better texture than can be achieved by the addition of lactate or reduction of pH. There also remains a need for fully cooked and hydrated mashed potatoes and potato pieces that have a reduced tendency to undergo syneresis during a relatively long shelf life under refrigerated conditions. The present invention addresses these needs.

SUMMARY OF THE INVENTION

This invention relates to stabilization of cooked and food products, especially fully hydrated mashed and/or cut potato compositions, against the development of toxins from pathogenic bacterial contaminants. The stabilized compositions are attained by the incorporation of nisin-containing dairy compositions derived from a nisin-producing culture. The invention also relates to methods of stabilizing cooked and food products, especially fully hydrated mashed and/or cut potato compositions, against the development of toxins, wherein the method comprises adding nisin-containing dairy compositions derived from a nisin-producing culture to the fully hydrated mashed and/or cut potato compositions. The stabilized starchy food products of this invention do not require, and preferably do not contain, conventional preservatives or stabilizers. The starchy food products of the present invention include fully hydrated mashed potatoes, cooked sliced potatoes, cooked cut potatoes pieces, starchy vegetables (e.g., sweet potatoes, winter squash, rice, corn, peas, legumes, soybeans), cooked stuffing compositions, pasta, dough, and the like which can be stored under refrigerated conditions for at least 3 months, and preferably for at least 7 months.

The compositions of the present invention include a nisin-containing dairy composition derived a dairy composition inoculated with a nisin-producing microorganism. Suitable dairy compositions include, for example, milk, reduced-fat milk, skim milk, whey, and the like. Generally, the nisin-containing dairy composition is prepared by inoculating a pasteurized dairy composition with a culture of a nisin-producing microorganism and incubating the composition, preferably until the pH obtains a value of about 4 to about 6. A nisin-containing whey can be prepared by inoculating a pasteurized dairy composition with a culture of a nisin-producing microorganism, incubating the composition until the pH attains a value between about 6.2 and about 4.0 and a whey and curd mixture is formed, and separating the whey from the whey and curd mixture to give the separated whey which is the nisin-containing whey. Alternatively, such a nisin-containing whey can be obtained from the fermentation of a fortified cheese whey composition using a nisin-producing microorganism.

The growth of microorganisms including *Clostridium botulinum*, *C. perfringens*, *Listeria monocytogenes*, *Bacillus cereus*, *Staphylococcus aureus*, and *Enterococcus faecalis* can be inhibited in starchy, ready-to-eat food products, including fully hydrated mashed and/or cut potatoes, using the methods of this invention. Generally, the nisin-containing dairy composition is incorporated into the cooked starchy food product in a proportion from about 2 to about 20 percent by weight, and more preferably about 5 to about 14 percent by weight. Preferably, the amount of nisin-containing dairy composition is incorporated into cooked starchy food product is sufficient to provide at least about 200 IU nisin/g, more preferably about 250 to about 1200 IU nisin/g, and most preferably about 300 to about 450 IU nisin/g.

The present invention provides a stabilized, fully hydrated starchy food product comprising a cooked and fully hydrated starchy foodstuff and nisin-containing dairy composition, wherein the stabilized, fully hydrated food product contains sufficient nisin-containing dairy composition to provide at least about 200 IU nisin/g and wherein the stabilized, fully hydrated starchy food product has a refrigerated shelf life of at least about 3 months.

The present invention also provides method of inhibiting the growth of pathogenic microorganisms in a starchy food product containing a cooked and fully hydrated starchy foodstuff, said method comprising the steps of (I) preparing a foodstuff composition comprising the cooked and fully hydrated starchy foodstuff and a nisin-containing dairy composition, (ii) packing the foodstuff composition in a container, (iii) sealing the packed foodstuff composition under low oxygen conditions in a package comprising high density UV barrier material to provide a packaged starchy food product, and (iv) storing the packaged starchy food product under refrigerated conditions;

wherein the amount of nisin-containing dairy composition is effective to inhibit the growth of pathogenic microorganisms and wherein the packaged starchy food product has a refrigerated shelf life of at least about 3 months.

In an especially preferred embodiment, the present invention also provides a stabilized, fully hydrated mashed potato product comprising cooked and fully hydrated mashed potatoes and a nisin-containing dairy composition, wherein the stabilized, fully hydrated mashed potato product contains sufficient nisin-containing dairy composition to provide at least about 200 IU nisin/g and wherein the stabilized, fully hydrated mashed potato product has a refrigerated shelf life of at least about 3 months.

DETAILED DESCRIPTION OF THE INVENTION

Figure 1:
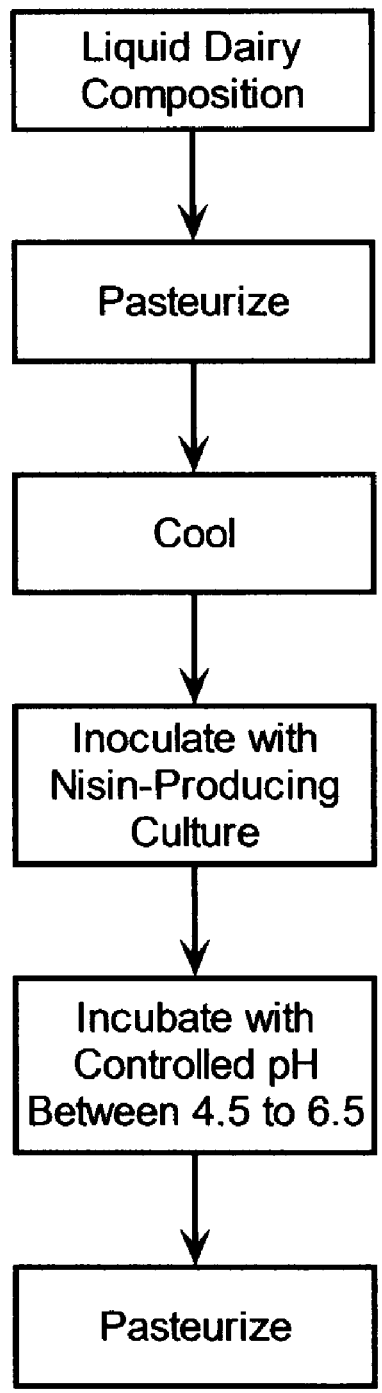
FIG. 1 provides a flow chart illustrating a simplified process for the production of a nisin-containing dairy composition derived from a culture of nisin-producing microorganisms.

This invention relates to stabilization of starchy food products, especially fully hydrated mashed potato compositions and/or fully cooked potato slices or pieces, against the development of toxins from pathogenic bacterial contaminants. The starchy food products of the present invention are cooked and fully hydrated such that they only require heating to the desired serving temperature in a conventional or microwave oven before eating. The stabilized compositions are attained by the incorporation of nisin-containing dairy composition derived from a nisin-producing culture. The invention also relates to methods of stabilizing starchy food products, especially fully hydrated mashed potato compositions and/or fully cooked potato slices or pieces, against the development of toxins, wherein the method comprises adding nisin-containing dairy composition derived from a nisin-producing culture to the fully hydrated mashed potato composition and/or fully cooked potato slices or pieces. The stabilized starchy food products of this invention do not require, and preferably do not contain, conventional preservatives or stabilizers. The starchy food products of the present invention include fully hydrated mashed potatoes, cooked sliced potatoes, cooked potatoes pieces, starchy vegetables (e.g., sweet potatoes, winter squash, rice, corn, peas, legumes, soybeans), cooked stuffing compositions, pasta, dough, and the like which can be stored under refrigerated conditions for at least 3 months, and preferably for at least 7 months.

In preferred embodiments, the starchy food product, especially fully hydrated mashed potatoes, includes at least one ingredient selected from the group consisting of a flavoring agent, a water absorbing agent, an anti-oxidant, a reducing agent, a chelator, and an emulsifier. Preferably, the starchy food products, especially fully hydrated mashed potatoes, include 0 to about 10 percent of a flavoring agent, 0 to about 5 percent of a water absorbing agent, 0 to about 2 percent of an anti-oxidant, 0 to about 2 percent of a reducing agent, 0 to about 2 percent of a chelator, and 0 to about 2 percent of an emulsifier. More preferably, the starchy food products, especially fully hydrated mashed potatoes, include about 1 to about 8 percent of a flavoring agent, about 0 to about 1 percent of a water absorbing agent, about 10 ppm to about 1 percent of an anti-oxidant, about 10 ppm to about 1 percent of a reducing agent, and about 10 ppm to about 1 percent of a chelator, and about 0.3 to about 1 percent of an emulsifier. Flavoring agents may include, for example, butter, margarine, milk, cream, NFDM, vegetable oil, hydrogenated oils, salt, pepper, other spices and herbs, and the like as well as mixtures thereof. Suitable water absorbing agents include hydrocolloids, gums, and starches. Especially preferred water absorbing agents include non-gelling or weakly gelling starches (modified or unmodified). Non-gelling starches may include, for example, starches from botanical sources such as waxy maize, corn, potatoes, tapioca, rice, peas, wheat, and the like as well as mixtures thereof. Suitable hydrocolloids include, for example, xanthan, smooth flow xanthan, guar, short chain guar, konjac, carrageenans, pectins, alginates, carboxymethyl cellulose, methycellulose, and gellan. Other suitable water absorbing agents include, for example, instant or cook-up starches, maltodextrins from various botanical sources (corn, potato, tapioca, and the like). Suitable antioxidants which may be included in the present compositions include, for example, rosemary extracts, tertiary butylhydroquinone (TBHQ), butylated hydroxyanisole (BHA), butylated hydroxytoluene (BHT), and the like as well as mixtures thereof. Suitable reducing agents which may be included in the present compositions include, for example, ascorbic acid, potassium sorbate, calcium propionate, sodium lactate, and the like as well as mixtures thereof. Suitable chelators which may be included in the present compositions include, for example, sodium acid pyrophosphate, ethylene diamine tetraacetic acid (EDTA), and the like as well as mixtures thereof. Suitable emulsifiers include mono and diglycerides, SSL (sodium-steoryl lactylate), DATEM (diacetyl tartaric acid methyl esters), and the like.

Incorporation of a water absorbing agent helps to prevent syneresis of the starchy food product and, thus, helps to maintain the desired texture and clean flavor during its prolonged shelf life. Flavoring agents, antioxidants, reducing agents, and chelators also help to maintain high quality flavor throughout the shelf life of the products. The addition of such additives and the use of suitable packaging techniques (e.g., hot packing (especially followed by rapid cooling) using high density UV barrier packaging materials under low oxygen (less than about 1 percent)) allow significant shelf lives without adversely effecting product quality and consumer acceptance. Suitable high density packaging materials include, for example, HDPE/EVOH, HDPE/PVDC, HDPE/EVOH/Surlyn, and similar films. Shelf lives at least 3 months, and preferably at least 7 months, for fully hydrated potatoes under refrigerated storage conditions are possible using the methods and compositions of this invention.

For purposes of this invention, the term "nisin-containing dairy composition" is intended to include nisin-containing dairy compositions wherein the nisin is derived from treatment of dairy compositions using cultures of nisin-producing microorganisums. Suitable dairy compositions from which the nisin-containing dairy compositions can be prepared include, for example, milk, reduced-fat milk, skim milk, whey, and the like. Generally, the nisin-containing dairy composition is prepared by inoculating a pasteurized dairy composition with a culture of a nisin-producing microorganism and incubating the composition, preferably until the pH obtains a value of about 4 to about 6. Generally, such a nisin-containing dairy composition is obtained by any of a variety of equivalent procedures involving fermentation of a dairy product using a nisin-producing microorganism. In one such procedure, a pasteurized dairy product such as milk or whey is first inoculated with the nisin-producing microorganism. If a curds-in-whey suspension is obtained, the curds and whey can, if desired, be separated by any conventional technique, including, for example, centrifugation, filtration, and the like. This method effectively removes most or essentially all of the microorganisms in the nisin-containing whey. In an alternative procedure, the nisin-containing whey is obtained from the fermentation of a fortified cheese whey composition using a nisin-producing microorganism. In this procedure, after the pH of the fermentation has fallen to about 5.5, the pH is maintained at this value for 8 to 10 hrs before allowing the pH to drop further. The nisin-containing whey can be employed in the products and methods of this invention.

It was shown in U.S. Pat. No. 6,136,351 (Oct. 24, 2000) and U.S. Pat. No. 6,242,017 (Jun. 5, 2001) that nisin-containing whey has effects on microorganisms beyond those obtained by addition of a purified preparation of nisin. Furthermore, it was also shown that nisin-containing whey contains, or preserves, a significant concentration of lactate characteristic of whey. Thus nisin-containing whey may in general be understood to contain both nisin and lactate. The fermenting cultures capable of producing nisin-containing dairy compositions or whey have the potential of secreting many fermentation products into the medium, namely, into the whey of the culture. Thus, in addition to nisin and lactate, there may be further components present in nisin-containing dairy compositions or nisin-containing whey produced by the fermentations yielding this whey. Among such components may be certain substances which contribute to the beneficial properties of the preservable preparations of the invention, and to the beneficial effects of the methods of the invention. Without wishing to limit the scope of this invention, therefore, the term "nisin-containing dairy composition" or "nisin-containing whey" encompasses all components contained therein, both those currently known and those which may remain uncharacterized at the present time, that contribute to the beneficial attributes of the present invention.

As used herein, "nisin-containing dairy compositions" also relates to the dairy compositions described above that has subsequently been reduced in volume to a more concentrated liquid, or that has been completely dried, by evaporation, lyophilization, or comparable procedures. The term relates additionally to such a concentrated or dried dairy composition that is subsequently reconstituted, either partially or completely, by the addition of water or a water-containing composition.

Stabilization of the starchy food compositions against the hazardous proliferation of pathogenic microorganisms is shown in the present invention to result from the incorporation of nisin-containing dairy compositions in such foods.

For purposes of this invention, nisin-containing dairy compositions include, for example, nisin-containing milk, nisin-containing whey, and/or other dairy liquids containing nisin, wherein the nisin is derived from a nisin-producing culture.

Figure 2:
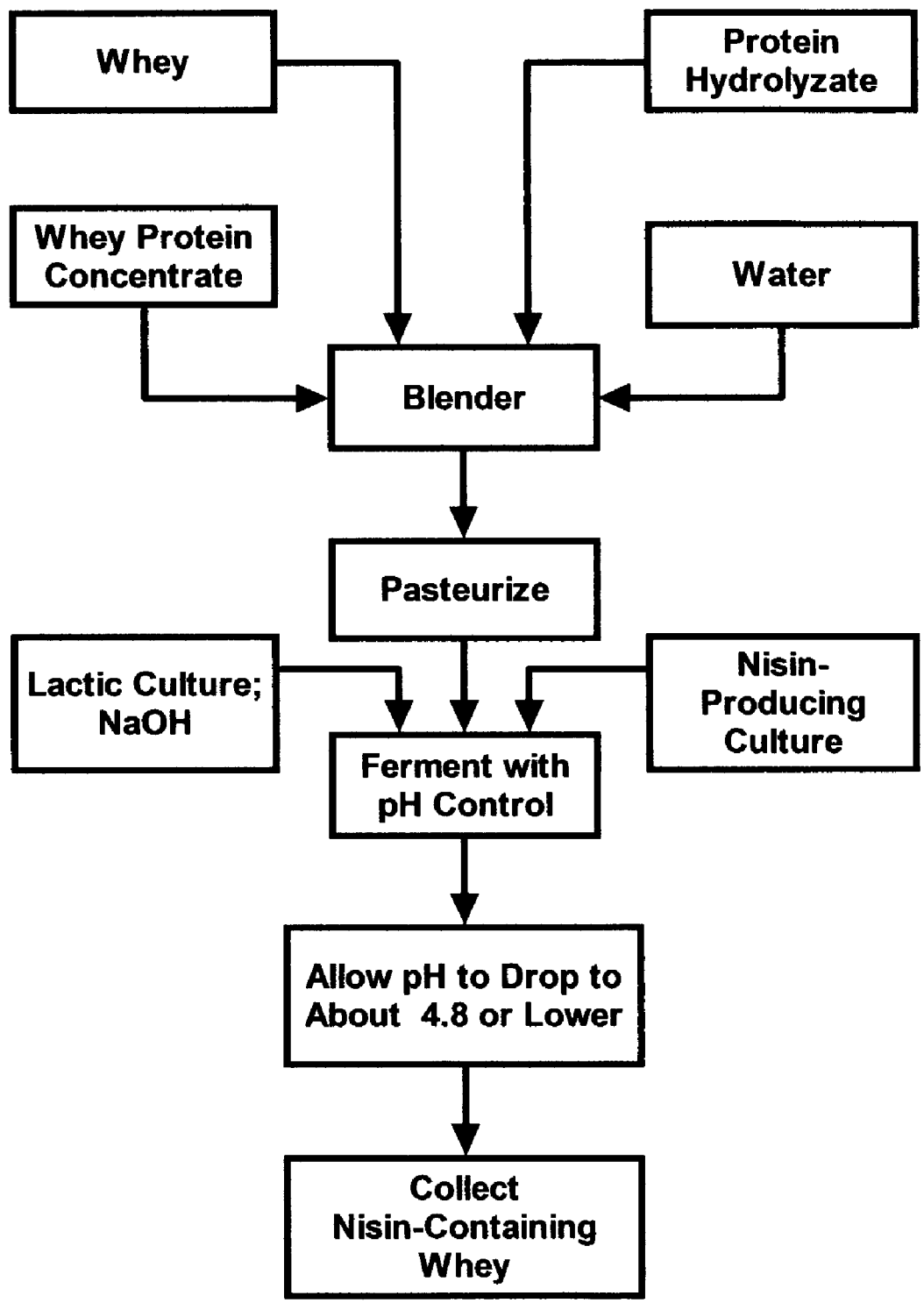
FIG. 2 provides a flow chart illustrating a process for the production of nisin-containing cultured whey.

FIG. 1 illustrates a simplified method of producing a nisin-containing dairy composition for use in the present invention. Such a nisin-containing dairy composition used in this invention may be obtained using a procedure that includes the following steps: (I) pasteurizing a dairy liquid such as whey or milk, including whole milk, partially defatted milk, or skim milk, (ii) cooling and inoculating the pasteurized dairy liquid with a culture of a nisin-producing microorganism, (iii) incubating the inoculated mixture until the pH has fallen to a range of about 4.5 to about 6.5 as a result of the fermentation, whereby a nisin-containing dairy composition is produced, (iv) pasteurizing the nisin-containing dairy composition, and (v) collecting the nisin-containing dairy composition. A nisin-containing cultured whey may also be prepared, as generally illustrated in FIG. 2, by the sequential steps of (I) preparing an aqueous composition comprising sweet whey from the fermentation of a cheese, whey protein concentrate, and a protein hydrolysate; (ii) fermenting the aqueous composition with a nisin-producing culture until the pH attains about 5.5; (iii) maintaining the pH of the fermenting composition at about 5 to about 5.5 for about 8 to about 10 hrs; and (iv) allowing the pH of the fermenting composition to drop to about 4.8 or lower. Of course, other methods can be used to prepare such nisin-containing dairy compositions for use in the present invention.

An example of a nisin-producing microorganism is *Lactococcus lactis* subsp. *lactis*. After collecting the nisin-containing dairy composition, it may be used as is, or it may be centrifuged in order to use the supernatant only, or a concentrate may be prepared by evaporation of the whole fermented dairy composition. The preparation of such nisin-containing whey is described in greater detail in U.S. patent application Ser. No. 09/779,712 (filed Feb. 8, 2001) and Ser. No. 09/779,756 (filed Feb. 8, 2001) and in U.S. Pat. No. 6,110,509 (Aug. 29, 2000), U.S. Pat. No. 6,113,954 (Sep. 5, 2000), U.S. Pat. No. 6,136,351 (Oct. 24, 2000), and U.S. Pat. No. 6,242,017 (Jun. 5, 2001), all of which have been incorporated by reference in their entireties.

Generally nisin-containing dairy composition concentrates are preferred since it is generally easier to control the moisture content of the resulting products to the desired levels by adding water. Preferably such nisin-containing dairy composition concentrates have solids contents greater than about 30 percent and nisin activities greater than about 5000 IU/g; more preferably such nisin-containing dairy composition concentrates have solids contents of about 40 to about 50 percent solids and nisin activities greater than about 10,000 IU/g.

As used herein, "cooked" starchy food products or "cooking" relate to heating the starchy food products which are the subject of the present invention in the presence of high humidity or liquid water to a temperature and for a time sufficient to cook and fully hydrate the starchy food products (i.e., to convert them from their raw starting state to the cooked state) so that they are suitable for human consumption. Commonly the temperature employed or the time of treatment are sufficient to raise the internal temperature to a particular value, or within a particular range of values, which is considerably below the boiling point of water. Such temperatures therefore may not be sufficient to kill or inactivate certain heat resistant pathogenic microorganisms, in particular their spores. A specific microorganism of concern in this regard is *C. botulinum*.

As used herein, the term "stabilized preparation" as applied to cooked starchy food products relates to a preparation which has been treated so that the growth of pathogenic microorganisms that may contaminate the preparation is inhibited or is retarded, or in which the production of toxins by such microorganisms is inhibited or retarded.

The starchy food products of the present invention may also include gravy. As used herein, "gravy" relates to gravies and/or sauces incorporated into the starchy food products preparations in order to impart flavor and favorable organoleptic properties to it. The gravy may also provide a composition for the incorporation of the nisin-containing dairy composition into the stabilized preparations and in implementing the methods of the invention. This is readily accomplished by replacing some or all of the water that would otherwise be used to constitute the gravy by the nisin-containing dairy composition of the invention. In addition, the gravies and sauces may contain other components that are commonly employed in their preparation. Such ingredients are widely known among food chemists. More preferably, the gravies or sauces preferred in the practice of this invention are those commonly associated with or used with cooked potatoes, especially mashed potatoes. Such gravies or sauces may be added to the starchy food product before or during packaging in the same containers or may be include in a container separate from the container for the starchy food product whereby the ultimate consumer may combine the starchy food product and the gravy or sauce before or after heating.

The refrigerated mashed potatoes of this invention can be prepared from raw or prepared (e.g., instant, dehydrated, and the like) potatoes. Although any variety of potatoes can be used, varieties having higher solids and/or higher amounts of starch are generally preferred; varieties having higher proportion of amylopectin to amylose (e.g., red potatoes, waxy varieties) are also preferred. Potatoes that have been genetically engineered so that they contain none or only small levels of amylose are also preferred. Generally, the refrigerated mashed potatoes of the present invention include about 70 to about 90 percent cooked and fully hydrated potatoes, about 1 to about 15 percent nisin-containing dairy composition, 0 to about 15 percent flavoring agent (e.g., butter, margarine, vegetable oil, and the like), 0 to about 2 percent water absorbing agent, 0 to about 1.5 percent monoglycerides, 0 to about 0.1 percent antioxidant (e.g., rosemary extracts, TBHQ, BHA, BHT, and the like), 0 to about 200 ppm reducing agent (e.g., ascorbic acid and the like), and 0 to about 0.1 percent chelator (e.g., sodium pyrophosphate, EDTA, and the like). More preferably, the refrigerated mashed potatoes of the present invention include about 70 to about 90 percent cooked and fully hydrated potatoes, about 1 to about 15 percent nisin-containing dairy composition, 2 to about 15 percent flavoring agent, about 0.1 to about 2 percent water absorbing agent, about 0.2 to about 1.5 percent monoglycerides, 10 ppm to about 0.1 percent antioxidant, about 10 to about 200 ppm reducing agent, about 0.01 to about 0.1 percent chelator, and about 0.1 to about 1.5 percent emulsifier.

The refrigerated sliced or cut potatoes of this invention can be prepared from raw potatoes. Although any variety of potatoes can be used, varieties having higher solids and/or higher amounts of starch are generally preferred; varieties having higher proportion of amylopectin to amylose (e.g., red potatoes, waxy varieties) are also preferred. Potatoes that have been genetically engineered so that they contain none or only small levels of amylose are also preferred. Generally, the refrigerated sliced potatoes of the present invention include about 90 to about 98 percent cooked and fully hydrated potatoes. The raw sliced or cut potatoes are blanched in about 1 to about 20 percent nisin-containing dairy composition, 0 to about 0.2 percent flavoring agent (e.g., salt, butter, margarine, vegetable oil, and the like), 0 to about 0.1 percent antioxidant (e.g., rosemary extracts, TBHQ, BHA, BHT, and the like), and 0 to about 1.0 percent chelator (e.g., sodium pyrophosphate, EDTA, and the like). More preferably, the refrigerated sliced or cut potatoes of the present invention include about 92 to about 97 percent cooked and fully hydrated potatoes, about 5 to about 20 percent nisin-containing dairy composition, 0 to about 0.1 percent flavoring agent, 10 ppm to about 0.01 percent antioxidant, and about 0.1 to about 0.8 percent chelator.

The starchy food products of this invention generally have a shelf life of at least 3 months, and preferably at least 7 months, under refrigerated storage conditions. Preferably the starchy food products of this invention are hot packed (generally at temperatures of about 160° F. or higher) in high density UV barrier packaging under low oxygen conditions. Low oxygen conditions may be obtained using conventional techniques (e.g., vacuum packing, inert gas flushing, and the like). Since the starchy food products are fully hydrated and are contained in a high moisture environment during storage, they can be easily warmed prior to consumption using, for example, a conventional or microwave oven.

The following examples illustrate various features of the present invention but are not intended to limit the scope of the invention, which is defined in the appended claims. All percentages used herein are by weight, unless otherwise indicated. All patents and other publications referenced herein are hereby incorporated by reference.

EXAMPLE 1

A nisin-producing culture was inoculated at about $2 \times 10^6$ cfu/ml in pasteurized skim milk cooled to about 30° C. The mixture was allowed to incubate for about 16 hours at pH 5.9, after which the pH was increased to about 6.4 using NaOH. The pasteurized fermented milk had about $8.0 \times 10^8$ cfu/ml of the cultured bacteria, a pH of about 4.6, and a nisin equivalent activity of about 1200 international units/ml as determined by well assay using a nisin-sensitive strain of *Lactococcus lactis* subsp. *cremoris*.

Russet potatoes were pealed and then blanched at about 212° C. for about 10 minutes. The blanched potatoes where then mashed using a conventional potato masher. After adding the remaining ingredients, the mashed potatoes were heated to about 170° C. for about 5 minutes. The resulting mashed potatoes were then hot-packed (at about 170° C.) in suitable containers having minimal headspace and then cooled and stored at refrigerated temperatures until used.

The following mashed potato compositions were prepared:

|  | Control | Sample 1 | Sample 2 | Sample 3 | Sample 4 | Sample 5 |
|---|---|---|---|---|---|---|
| Potatoes | 88.9 | 88.9 | 80.7 | 80.8 | 80.8 | 80.8 |
| Butter (unsalted) | 0 | 0 | 7.1 | 7.1 | 7.1 | 1.75 |
| NaCl | 0 | 0 | 0.7 | 0.7 | 0.7 | 0.7 |
| Milk | 11.1 | 0 | 0 | 0 | 0 | 0 |
| Nisin-containing Milk | 0 | 11.1 | 11.1 | 11.1 | 11.1 | 11.1 |
| Potassium Sorbate | 0 | 0 | 0.05 | 0.05 | 0.05 | 0.05 |
| Mirathic 603 | 0 | 0 | 0.25 | 0.25 | 0.25 | 0.25 |
| SAPP | 0 | 0 | 0.025 | 0.025 | 0.025 | 0.025 |
| Ascorbic Acid | 0 | 0 | 0 | 0.025 | 0.05 | 0.025 |
| Rosemary Extract | 0 | 0 | 0 | 0.0025 | 0.0025 | 0.0025 |

EXAMPLE 2

Mashed potato compositions were prepared using a control formula (no nisin-containing cultured milk or other nisin-containing dairy composition) and mashed potato formulated with nisin-containing cultured milk, according to the method presented in Example 1. Separate challenge studies were implemented for inocula of non-proteolytic strains of *C. botulinum* and proteolytic strains of *C. botulinum*. The following strains (see Table 1) were blended to prepare inocula of *C. botulinum* for use in the challenge studies with mashed potato compositions preserved using nisin-containing cultured milk.

TABLE 1

C. botulinum strains Used in Challenge Studies

| Proteolytic Strains | | Non-Proteolytic Strains | |
|---|---|---|---|
| Strain | Spore Count/ml | Strain | Spore Count/ml |
| 33A | $2.6 \times 10^5$ | 17B | $\sim 3 \times 10^5$ |
| 36A | $5.4 \times 10^4$ | | |
| 62A | $1.3 \times 10^5$ | | |
| 213B | $3.7 \times 10^5$ | | |
| 53B | $2.0 \times 10^5$ | | |
| ACC1B | $3.4 \times 10^5$ | | |

No growth of the spores was observed on brain-heart infusion agar incubated under aerobic conditions. Thus the spore suspensions were essentially free of aerobic spores. For the proteolytic strains, 1 ml aliquots of each of the strains were combined and heat-shocked at 80° C. for 10 min. This mixed-strain suspension was assayed under anaerobic conditions on McClung's egg yolk agar and found to contain $10^5$ spores/ml. For the non-proteolytic strain, 1 ml aliquot of the strain was heat-shocked at 60° C. for 13 min. This suspension was assayed anaerobically on McClung's egg yolk agar and shown to contain $10^5$ spores/ml.

A heat-shocked suspension of the respective spores (proteolytic or nonproteolytic; population each about $1 \times 10^5$ spores/ml) was transferred to a sterile tube. An appropriate volume of the appropriate spore suspension was then inoculated into 3000 g of the control or experimental mashed potato composition (sample 1) that had been prepared according to Example 1. The spore count in the resulting products was about 100–500 spores/g. Uninoculated product was similarly prepared, using sterile water in place of spore suspensions. Inoculated and uninoculated mashed potato samples were sealed into tubes, stored in an anaerobic atmosphere, and incubated at 30° C. for various periods of time. These were assayed for pH, nisin concentration, aerobic colony count, anaerobic colony counts for non-proteolytic and for proteolytic strains of C. botulinum, and by the standard mouse bioassay procedure for presence of botulinum toxin. The results are shown in Table 2 (control mashed potatoes with no added nisin-containing cultured milk) and Table 3 (inventive mashed potatoes with added nisin-containing cultured milk—sample 1 of Example 1).

TABLE 2

Efficiency of Nisin-Containing Cultured Milk as an Inhibitor of *Clostridium botulinum* Growth and Toxin Production in Cooked, Mashed Potatoes - Nonproteolytic inoculum suspension: $9.0 \times 10^4$ CFU/ml; Proteolytic inoculum suspension: $2.2 \times 10^5$ CFU/ml; Mashed Potato Control (No Nisin-Containing Cultured Milk)

| | Time (Hours) at 30° C. | | | | | | | | | | | |
|---|---|---|---|---|---|---|---|---|---|---|---|---|
| | 0 | 18 | 24 | 37 | 42 | 48 | 60 | 66 | 72 | 88 | 96 | 9 Days |
| Product pH | 5.87 | 5.90 | 5.90 | 5.91 | 5.89 | 5.87 | 5.95 | 5.90 | 5.92 | 5.69 | 5.81 | NT |
| Nisin Concentration (U/g) | ND | NT | NT | NT | NT | NT | NT | NT | NT | NT | NT | NT |
| Aerobic background (CFU/g) | <10 | <10 | <10 | $1.4 \times 10^{4*}$ | $1.6 \times 10^{4*}$ | $2.6 \times 10^{5*}$ | NT | NT | NT | NT | NT | NT |
| Inoculum Counts (CFU/g) | | | | | | | | | | | | |
| Uninoculated | <10 | NT | NT | NT | NT | NT | NT | NT | NT | NT | NT | NT |
| Nonproteolytic Inoculated | 190 | NT | NT | NT | NT | NT | NT | NT | NT | NT | NT | NT |
| Proteolytic Inoculated | 180 | NT | NT | NT | NT | NT | NT | NT | NT | NT | NT | NT |
| Mouse bioassay toxin results | | | | | | | | | | | | |
| Uninoculated | − | − | − | − | − | − | − | − | − | − | − | NT |
| Nonproteolytic Inoculated | − | − | − | − | − | − | − | − | − | +** | + | NT |
| Proteolytic Inoculated | − | − | − | − | − | − | − | − | − | − | + | NT |

"ND" = None detected;
"NT" = Not Tested;
"−" = no toxin;
"+" = toxin present;
*Genus *Bacillus*;
**3 of 3 replicates toxin positive

TABLE 3

Efficiency of Nisin-Containing Cultured Milk as an Inhibitor of *Clostridium botulinum*
Growth and Toxin Production in Cooked, Mashed Potatoes - Nonproteolytic inoculum suspension:
$9.0 \times 10^4$ CFU/ml; Proteolytic inoculum suspension: $2.2 \times 10^5$ CFU/ml;
Mashed Potatoes with Nisin-Containing Cultured Milk

| | Time (Hours) at 30° C. | | | | | | | | | | | |
|---|---|---|---|---|---|---|---|---|---|---|---|---|
| | 0 | 18 | 24 | 37 | 42 | 48 | 60 | 66 | 72 | 88 | 96 | 9 Days |
| Product pH | 5.84 | 5.87 | 5.87 | 5.86 | 5.86 | 5.84 | 5.84 | 5.83 | 5.75 | 5.81 | 5.82 | 5.82 |
| Nisin Concentration (U/g) | 320 | NT | 256 | NT | NT | 224 | NT | NT | 226 | NT | 211 | 220 |
| Aerobic background (CFU/g) | <10 | <10 | <10 | <10 | <10 | <10 | <10 | <10 | <10 | <10 | <10 | <10 |
| Inoculum Counts (CFU/g) | | | | | | | | | | | | |
| Uninoculated | <10 | NT | NT | NT | NT | NT | NT | NT | NT | NT | NT | NT |
| Nonproteolytic Inoculated | 200 | NT | NT | NT | NT | NT | NT | NT | NT | NT | NT | NT |
| Proteolytic Inoculated | 250 | NT | NT | NT | NT | NT | NT | NT | NT | NT | NT | NT |
| Mouse bioassay toxin results | | | | | | | | | | | | |
| Uninoculated | − | − | − | − | − | − | − | − | − | − | − | − |
| Nonproteolytic Inoculated | − | − | − | − | − | − | − | − | − | − | − | +* |
| Proteolytic Inoculated | − | − | − | − | − | − | − | − | − | − | − | − |

"NT" = Not Tested;
"−" = no toxin;
"+" = toxin present;
*Only 1 of 3 replicates toxin positive The results in Tables 2 and 3 show that use of the nisin-containing cultured milk of the invention resulted in a significant delay of toxin production, compared to the control in which nisin-containing cultured milk has been omitted. Toxin from nonproteolytic *C. botulinum* was first detected at 88 hours in the control mashed potato preparation. At this time point, all three control formula replicates were positive for toxin. This is in contrast to the mashed potato preparation formulated with nisin-containing cultured milk, where toxin from nonproteolytic *C. botulinum* was first detected at 9 days. Although no samples were collected between the 96-hour and 9-day point, what is significant is that only one of the three day-9 replicates of the nisin-containing milk formulated potatoes contained toxin. With the proteolytic strains of *C. botulinum*, toxin was first detected at 96 hours in the control mashed potato preparation. In the mashed potato preparation formulated with nisin-containing cultured milk, proteolytic *C. botulinum* did not produce toxin during the 9-day study. It was also noted that low background levels of *Bacillus* present in the mashed potatoes grew to a high population in the control preparation within 37 hours. In the samples formulated with nisin-containing cultured milk, the growth of *Bacillus* was inhibited throughout the 9-day study. Thus the nisin-containing, cultured-milk-formulated product delayed toxin production by the significant intervals of at least 8 hours (nonproteolytic inoculum) and greater than 120 hours (proteolytic strains) as compared to the control product without cultured milk.

EXAMPLE 3

Additional challenge studies were carried out separately on mashed potatoes formulated with the nisin-containing cultured milk. Studies were conducted with the same *C. botulinum* strains described above, using essentially the same techniques as described in Example 2. Products were formulated as described in Example 1 (corresponding to samples 2–5 of Example 1) and held under abusive refrigerated conditions. The results for four formulations (samples 2–5 in Example 1) were very similar; the data presented in Table 4 is representative of the date for each of the formulations.

TABLE 4

*Clostridium botulinum* Control in Cooked, Mashed Potatoes Under
Refrigerated Storage - Nonproteolytic inoculum suspension: $1.5 \times 10^5$ CFU/ml;
Proteolytic inoculum suspension: $1.7 \times 10^5$ CFU/ml; Mashed
Potatoes with Nisin-Containing Cultured Milk

| | Initial | 24 hrs at 30° C. | 1 Week at 18° C. | Weeks at 13° C. | | | | | | | | | | |
|---|---|---|---|---|---|---|---|---|---|---|---|---|---|---|
| | | | | 2 | 4 | 6 | 8 | 10 | 12 | 15 | 20 | 22 | 25 | 30 |
| Product pH | 5.98 | 6.01 | 5.98 | 5.96 | 5.98 | 6.00 | 6.02 | 5.96 | 5.99 | 5.98 | 6.00 | 5.96 | 5.98 | 5.97 |
| Nisin | 491 | 444 | 519 | 521 | 465 | 419 | 404 | 410 | 412 | 395 | 368 | 383 | 407 | 438 |

TABLE 4-continued

*Clostridium botulinum* Control in Cooked, Mashed Potatoes Under Refrigerated Storage - Nonproteolytic inoculum suspension: 1.5 × $10^5$ CFU/ml; Proteolytic inoculum suspension: 1.7 × $10^5$ CFU/ml; Mashed Potatoes with Nisin-Containing Cultured Milk

| | Initial | 24 hrs at 30° C. | 1 Week at 18° C. | Weeks at 13° C. 2 | 4 | 6 | 8 | 10 | 12 | 15 | 20 | 22 | 25 | 30 |
|---|---|---|---|---|---|---|---|---|---|---|---|---|---|---|
| Concentration (U/g) | | | | | | | | | | | | | | |
| Aerobic background (CFU/g) | <10 | <10 | <10 | <10 | <10 | <10 | <10 | <10 | <10 | <10 | <10 | <10 | <10 | <10 |
| Inoculum Counts (CFU/g) | | | | | | | | | | | | | | |
| Uninoculated | <10 | NT | NT | NT | NT | NT | NT | NT | NT | NT | NT | NT | NT | NT |
| Nonproteolytic Inoculated | 130 | NT | NT | NT | NT | NT | NT | NT | NT | NT | NT | NT | NT | NT |
| Proteolytic Inoculated | 100 | NT | NT | NT | NT | NT | NT | NT | NT | NT | NT | NT | NT | NT |
| Mouse bioassay toxin results | | | | | | | | | | | | | | |
| Uninoculated | – | – | – | – | – | – | – | – | – | – | – | – | – | – |
| Nonproteolytic Inoculated | – | – | – | – | – | – | – | – | – | – | – | – | – | – |
| Proteolytic Inoculated | – | – | – | – | – | – | – | – | – | – | – | – | – | – |

"NT" = Not Tested;
"–" = no toxin

The results in Table 4 show that the inventive mashed potatoes containing nisin-containing cultured milk provides a significant level of product safety and shelf life stability at abusive as well as refrigerated temperature storage conditions.

EXAMPLE 4

Pasteurized whey cooled to 30° C. was inoculated with a nisin-producing culture at 2×$10^6$ cfu/ml. The mixture was incubated for about 6 hours to pH 5.5; the pH was adjusted to about 5 with NaOH and maintained for a further 10 hours. The resulting nisin-containing whey contained about 8×$10^8$ cfu/ml of the cultured bacteria and had a nisin equivalent activity of about 1400 international units/ml as determined by well assay using a nisin-sensitive strain of *Lactococcus lactis* subsp. *cremoris.*

Russet potatoes were pealed, sliced (about ½ inch cubes), and blanched at about 180° C. for about 30 minutes in the nisin-containing whey. The cubes were cooled and packaged in suitable containers having minimal headspace and stored at refrigerated temperatures until evaluated. For evaluation, the cubes were cut in half. The nisin activity was measured on the original surface (i.e., outer surface of the original cubes) and the freshly exposed surface (i.e., the new surface formed by cutting the cubes in half) after both 2 and 4 weeks storage at refrigerated temperatures. The following results were obtained.

TABLE 5

Nisin (U/g) penetration in sliced potatoes blanched in nisin-containing whey and held for 2 and 4 weeks.

| U/g nisin | 2 weeks | 4 weeks |
|---|---|---|
| Original surface | 408 U/g | 415 U/g |
| Newly cut surface | 42 U/g | 88 U/g |

These results show that the nisin penetrates into the interior of the blanched potato slices and that this penetration increases over time.

EXAMPLE 5

Pasteurized whey cooled to 30° C. was inoculated with a nisin-producing culture at 2×$10^6$ cfu/ml. The mixture was incubated for about 6 hours to pH 5.5; the pH was adjusted to about 5 with NaOH and maintained for a further 10 hours. The resulting nisin-containing whey had about 8.0×$10^8$ cfu/ml of the cultured bacteria, a pH of about 5, and a nisin equivalent activity of about 1400 international units/ml as determined by well assay using a nisin-sensitive strain of *Lactococcus lactis* subsp. *cremoris.*

Russet potatoes (2000 pounds) were peeled and sliced (about ⅛ inch thickness) and blanched in water containing about 33 percent nisin-containing whey, about 0.9 percent sodium acid pyrophosphate (SAPP), about 0.8 percent sorbate, about 0.005 percent rosemary, and about 0.2 percent salt at about 180° F. for about 10 minutes. Slices were then cooled and packaged in suitable containers with minimal headspace and then stored at refrigerated temperatures until used.

Sliced potatoes packages were pulled from the beginning, middle, and end of the production run and then sampled from multiple places within each package. The samples were homogenized and then analyzed for nisin concentration. The following results were obtained.

TABLE 6

Nisin activity (U/g) of 1/8" sliced potatoes.

| Location of Sample in Production Run | Location of Sample Within Package | Sample 1 | Sample 2 | Sample 3 |
|---|---|---|---|---|
| Beginning | Top | 732 | 747 | 749 |
|  | Middle | 697 | 699 | 724 |
|  | Bottom | 728 | 755 | 793 |
| Middle | Top | 702 | 703 | 687 |
|  | Middle | 773 | 834 | 780 |
|  | Bottom | 760 | 798 | 817 |
| End | Top | 683 | 759 | 724 |
|  | Middle | 727 | 775 | 757 |
|  | Bottom | 730 | 763 | 736 |

These results demonstrate consistent delivery of nisin activity throughout the product run and throughout each individual package.

The invention claimed is:

1. A stabilized, fully hydrated starchy food product comprising a cooked and fully hydrated starchy foodstuff and nisin-containing dairy composition, wherein the stabilized, fully hydrated starchy food product contains sufficient nisin-containing dairy composition to provide at least about 200 IU nisin/g, wherein the stabilized, fully hydrated starchy food product has a refrigerated shelf life of at least about 3 months, and wherein the starch foodstuff is selected from the group consisting of mashed potatoes, sliced potatoes, and cut potatoes pieces.

2. The stabilized, fully hydrated nisin-containing food product described in claim 1, wherein the nisin-containing dairy composition is prepared by a process comprising the steps of
(I) inoculating a pasteurized dairy composition with a culture of a nisin-producing microorganism;
(ii) incubating the inoculated pasteurized dairy composition until the pH attains a value between about 6.2 and about 4.0 to form the nisin-containing dairy composition; and
(iii) collecting the nisin-containing dairy composition.

3. The stabilized, fully hydrated starchy food product described in claim 2, wherein the dairy composition is milk or whey.

4. The stabilized, fully hydrated starchy food product described in claim 1, wherein the stabilized, fully hydrated starchy food product inhibits the growth of microorganisms chosen from the group consisting of *Clostridium botulinum, C. perfringens, Listeria monocytogenes, Bacillus cereus, Staphylococcus aureus,* and *Enterococcus faecalis.*

5. The stabilized, fully hydrated starchy food product described in claim 4, wherein the microorganism is *C. botulinum.*

6. The stabilized, fully hydrated starchy food product described in claim 1, wherein the stabilized, fully hydrated starchy food product contains sufficient nisin-containing dairy composition to provide about 250 to about 1200 IU nisin/g.

7. The stabilized, fully hydrated starchy food product described in claim 6, wherein the stabilized, fully hydrated starchy food product contains sufficient nisin-containing dairy composition to provide about 300 to about 450 IU nisin/g.

8. The stabilized, fully hydrated starchy food product described in claim 1, wherein the cooked and fully hydrated starchy food product is mashed potatoes.

9. The stabilized, fully hydrated starchy food product described in claim 1, wherein the cooked and fully hydrated starchy food product is sliced potatoes.

10. The stabilized, fully hydrated starchy food product described in claim 8, wherein the stabilized, fully hydrated starchy food product comprises about 70 to about 90 percent cooked and fully hydrated mashed potatoes, about 1 to about 15 percent nisin-containing dairy composition, 0 to about 10 percent flavoring agent, 0 to about 5 percent water absorbing agent, 0 to about 1.5 percent monoglycerides, 0 to about 0.1 percent antioxidant, 0 to about 200 ppm reducing agent, 0 to about 0.1 percent chelator, and about 0 to about 1.5 percent emulsifier.

11. The stabilized, fully hydrated starchy food product described in claim 10, wherein the stabilized, fully hydrated starchy food product comprises about 70 to about 90 percent cooked and fully hydrated mashed potatoes, about 1 to about 15 percent nisin-containing whey, 2 to about 15 percent flavoring agent, about 0.1 to about 2 percent water absorbing agent, about 0.2 to about 1.5 percent monoglycerides, 10 ppm to about 0.1 percent antioxidant, about 10 to about 200 ppm reducing agent, about 0.01 to about 0.1 percent chelator, and about 0.3 to about 1.5 percent emulsifier.

12. A method of inhibiting the growth of pathogenic microorganisms in a starchy food product containing a cooked and fully hydrated starchy foodstuff, said method comprising the steps of
(I) preparing a foodstuff composition comprising the cooked and fully hydrated starchy foodstuff and a nisin-containing dairy composition,
(ii) hot packing the foodstuff composition in a container,
(iii) sealing the hot packed foodstuff composition under low oxygen conditions in a package comprising high density UV barrier material to provide a packaged starchy food product, and
(iv) storing the packaged starchy food product under refrigerated conditions;
wherein the amount of nisin-containing dairy composition is effective to inhibit the growth of pathogenic microorganisms, wherein the stabilized, fully hydrated starchy food product has a refrigerated shelf life of at least about 3 months, and wherein the starch foodstuff is selected from the group consisting of mashed potatoes, sliced potatoes, and cut potatoes pieces.

13. The method described in claim 12, wherein the nisin-containing dairy composition is prepared by a process comprising the steps of
(I) inoculating a pasteurized dairy composition with a culture of a nisin-producing microorganism;
(ii) incubating the inoculated pasteurized dairy composition until the pH attains a value between about 6.2 and about 4.0 to form the nisin-containing dairy composition; and
(iii) collecting the nisin-containing dairy composition.

14. The method described in claim 12, wherein the microorganisms are chosen from the group consisting of

*Clostridium botulinum, C. perfringens, Listeria monocytogenes, Bacillus cereus, Staphylococcus aureus,* and *Enterococcus faecalis.*

15. The method described in claim 14, wherein the microorganisms are *C. botulinum*.

16. The method described in claim 12, wherein the food product contains sufficient nisin-containing dairy composition to provide about 200 to about 1200 IU nisin/g.

17. The method described in claim 16, wherein the food product contains sufficient nisin-containing dairy composition to provide about 300 to about 700 IU nisin/g.

18. The method described in claim 12, wherein the cooked and fully hydrated foodstuff is mashed potatoes.

19. The method described in claim 12, wherein the cooked and fully hydrated foodstuff is sliced potatoes.

20. The method described in claim 18, wherein the packaged starchy food product comprises about 70 to about 90 percent cooked and fully hydrated mashed potatoes, about 1 to about 15 percent nisin-containing dairy composition, 0 to about 15 percent flavoring agent, 0 to about 2 percent water absorbing agent, 0 to about 1.5 percent monoglycerides, 0 to about 0.1 percent antioxidant, 0 to about 200 ppm reducing agent, 0 to about 0.1 percent chelator, and about 0.3 to about 1.5 percent emulsifier.

21. The method described in claim 18, wherein the packaged starchy food product comprises about 70 to about 90 percent cooked and fully hydrated mashed potatoes, about 1 to about 15 percent nisin-containing dairy composition, 2 to about 15 percent flavoring agent, about 0.1 to about 2 percent water absorbing agent, about 0.2 to about 1.5 percent monoglycerides, 10 ppm to about 0.1 percent antioxidant, about 10 to about 200 ppm reducing agent, about 0.01 to about 0.1 percent chelator, and about 0.3 to about 1.5 percent emulsifier.

22. A stabilized, fully hydrated mashed potato product comprising cooked and fully hydrated mashed potatoes and nisin-containing dairy composition, wherein the stabilized, fully hydrated mashed potato product contains sufficient nisin-containing dairy composition to provide at least about 200 IU nisin/g and wherein the stabilized, fully hydrated mashed potato product has a refrigerated shelf life of at least about 3 months.

23. The stabilized, fully hydrated mashed potato product described in claim 22, wherein the nisin-containing whey is prepared by a process comprising the steps of (I) inoculating a pasteurized dairy composition with a culture of a nisin-producing microorganism;

(ii) incubating the inoculated pasteurized dairy composition until the pH attains a value between about 6.2 and about 4.0 to form the nisin-containing dairy composition; and (iii) collecting the nisin-containing dairy composition.

24. The stabilized, fully hydrated mashed potato product described in claim 23, wherein the stabilized, fully hydrated mashed potato product contains sufficient nisin-containing dairy composition to provide about 200 to about 1200 U nisin/g.

25. The stabilized, fully hydrated mashed potato product described in claim 24, wherein the stabilized, fully hydrated mashed potato product contains sufficient nisin-containing dairy composition to provide about 300 to about 700 IU nisin/g.

26. The stabilized, fully hydrated mashed potato product described in claim 21, wherein the stabilized, fully hydrated mashed potato product comprises about 70 to about 90 percent cooked and fully hydrated mashed potatoes, about 1 to about 15 percent nisin-containing dairy composition, 0 to about 15 percent flavoring agent, 0 to about 2 percent water absorbing agent, 0 to about 1.5 percent monoglycerides, 0 to about 0.1 percent antioxidant, 0 to about 200 ppm reducing agent, 0 to about 0.1 percent chelator, and about 0.3 to about 1.5 percent emulsifier.

27. The stabilized, fully hydrated mashed potato product described in claim 26, wherein the stabilized, fully hydrated mashed potato product comprises about 70 to about 90 percent cooked and fully hydrated mashed potatoes, about 1 to about 15 percent nisin-containing dairy composition, 2 to about 15 percent flavoring agent, about 0.1 to about 2 percent water absorbing agent, about 0.2 to about 1.5 percent monoglycerides, 10 ppm to about 0.1 percent antioxidant, about 10 to about 200 ppm reducing agent, about 0.01 to about 0.1 percent chelator, and about 0.3 to about 1.5 percent emulsifier.

* * * * *

UNITED STATES PATENT AND TRADEMARK OFFICE
CERTIFICATE OF CORRECTION

| | | |
|---|---|---|
| PATENT NO. | : 7,001,633 B2 | Page 1 of 1 |
| APPLICATION NO. | : 10/439815 | |
| DATED | : February 21, 2006 | |
| INVENTOR(S) | : Pasch et al. | |

It is certified that error appears in the above-identified patent and that said Letters Patent is hereby corrected as shown below:

- On Title page (56), column 2, (U.S. Patent Documents), line 14, after 6,613,364, delete "B1", and insert -- B2 --.

- On Title page (56), column 2, (U.S. Patent Documents), line 16, after 6,797,308, delete "B1", and insert -- B2 --.

- In column 22, claim 27, line 12, delete "U" and insert -- IU --.

Signed and Sealed this

Twenty-first Day of November, 2006

JON W. DUDAS
*Director of the United States Patent and Trademark Office*